United States Patent
Wimmer

(10) Patent No.: US 9,469,278 B2
(45) Date of Patent: Oct. 18, 2016

(54) DEVICE AND METHOD FOR APPLYING A CLEANING FLUID TO A WHEEL OF A VEHICLE IN A VEHICLE WASHING INSTALLATION AND VEHICLE-WASHING DEVICE

(75) Inventor: Georg Wimmer, Affing (DE)

(73) Assignee: WASHTEC HOLDING GMBH, Augsburg (DE)

( * ) Notice: Subject to any disclaimer, the term of this patent is extended or adjusted under 35 U.S.C. 154(b) by 669 days.

(21) Appl. No.: 13/819,874

(22) PCT Filed: May 26, 2011

(86) PCT No.: PCT/EP2011/058629
§ 371 (c)(1),
(2), (4) Date: Apr. 12, 2013

(87) PCT Pub. No.: WO2012/028346
PCT Pub. Date: Mar. 8, 2012

(65) Prior Publication Data
US 2013/0186432 A1    Jul. 25, 2013

(30) Foreign Application Priority Data
Sep. 2, 2010   (DE) .................. 10 2010 036 190

(51) Int. Cl.
*B08B 7/00*   (2006.01)
*B60S 3/06*   (2006.01)
*B60S 3/04*   (2006.01)

(52) U.S. Cl.
CPC . *B60S 3/06* (2013.01); *B60S 3/042* (2013.01)

(58) Field of Classification Search
None
See application file for complete search history.

(56) References Cited

U.S. PATENT DOCUMENTS 4,985,957 A * 1/1991 Belanger et al. ............... 15/53.4
2013/0186432 A1 * 7/2013 Wimmer .................. B60S 3/06
134/6

FOREIGN PATENT DOCUMENTS

DE    3518297 A1    11/1986
DE    9000427 U1    3/1991
(Continued)

OTHER PUBLICATIONS

International Preliminary Report on Patentability (IPRP) published Mar. 5, 2013 for International Patent Application No. PCT/EP2011/058629 filed on May 26, 2011.
(Continued)

*Primary Examiner* — Eric Golightly
(74) *Attorney, Agent, or Firm* — Paul D. Bianco; Katharine Davis; Fleit Gibbons Gutman Bongini & Bianco PL

(57) ABSTRACT

A device for applying a cleaning fluid to a wheel of a vehicle in a vehicle washing installation using a spray nozzle and a wheel washing brush that is driven in rotation and can be moved by a guide between a rest position remote from a wheel and a cleaning position on the wheel. The device, an associated vehicle washing installation and method each permit economical application of the cleaning fluid matched to the size of the wheels to be cleaned. The method includes the steps of: a) determining the position of the wheel in the washing direction, b) determining the distance of the wheel from the device, c) moving the spray nozzle to the spraying position at the spraying distance from the wheel, d) spraying cleaning fluid onto the wheel using the spray nozzle (4) and moving the spray nozzle along the wheel in the washing direction and e) terminating the spraying operation when the front end of the wheel in the washing direction has been reached.

10 Claims, 2 Drawing Sheets

(56) References Cited

FOREIGN PATENT DOCUMENTS

| DE | 9311390 U1 | * | 10/1993 |
| DE | 202008012139 U1 | | 2/2010 |
| EP | 0700814 A1 | * | 3/1996 |
| EP | 0752353 A1 | * | 1/1997 |
| EP | 2077211 A1 | * | 7/2009 |

OTHER PUBLICATIONS

International Search Report (ISR) published Mar. 8, 2012 for International Patent Application No. PCT/EP2011/058629 filed on May 26, 2011.

Written Opinion (WO) for International Patent Application No. PCT/EP2011/058629 filed on May 26, 2011.

* cited by examiner

Fig. 1 (State of the Art)
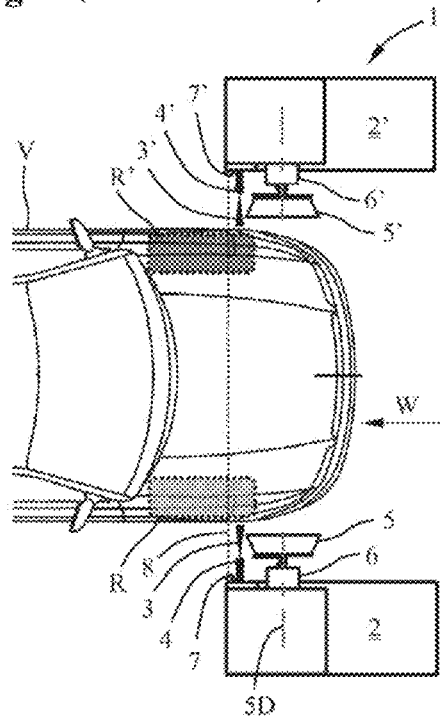
Fig. 3
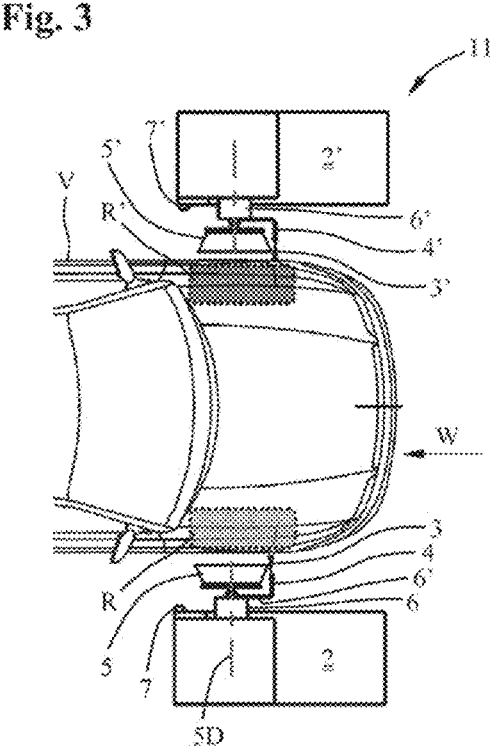
Fig. 2 (State of the Art)
a)
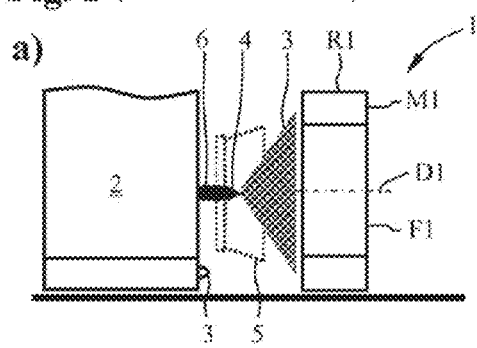
b)
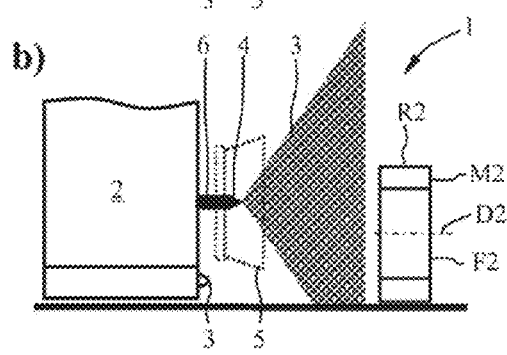
Fig. 4
a)
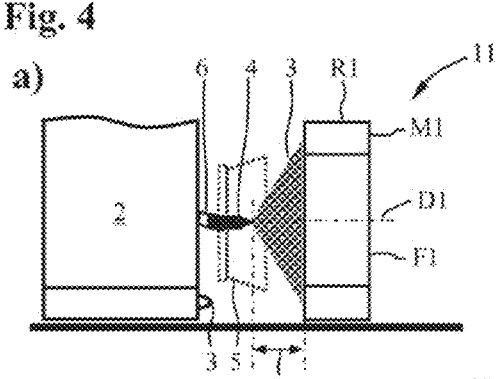
b)
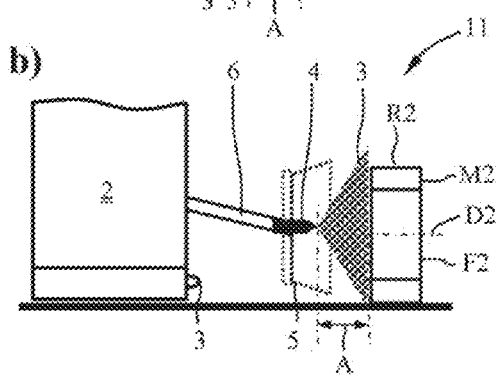

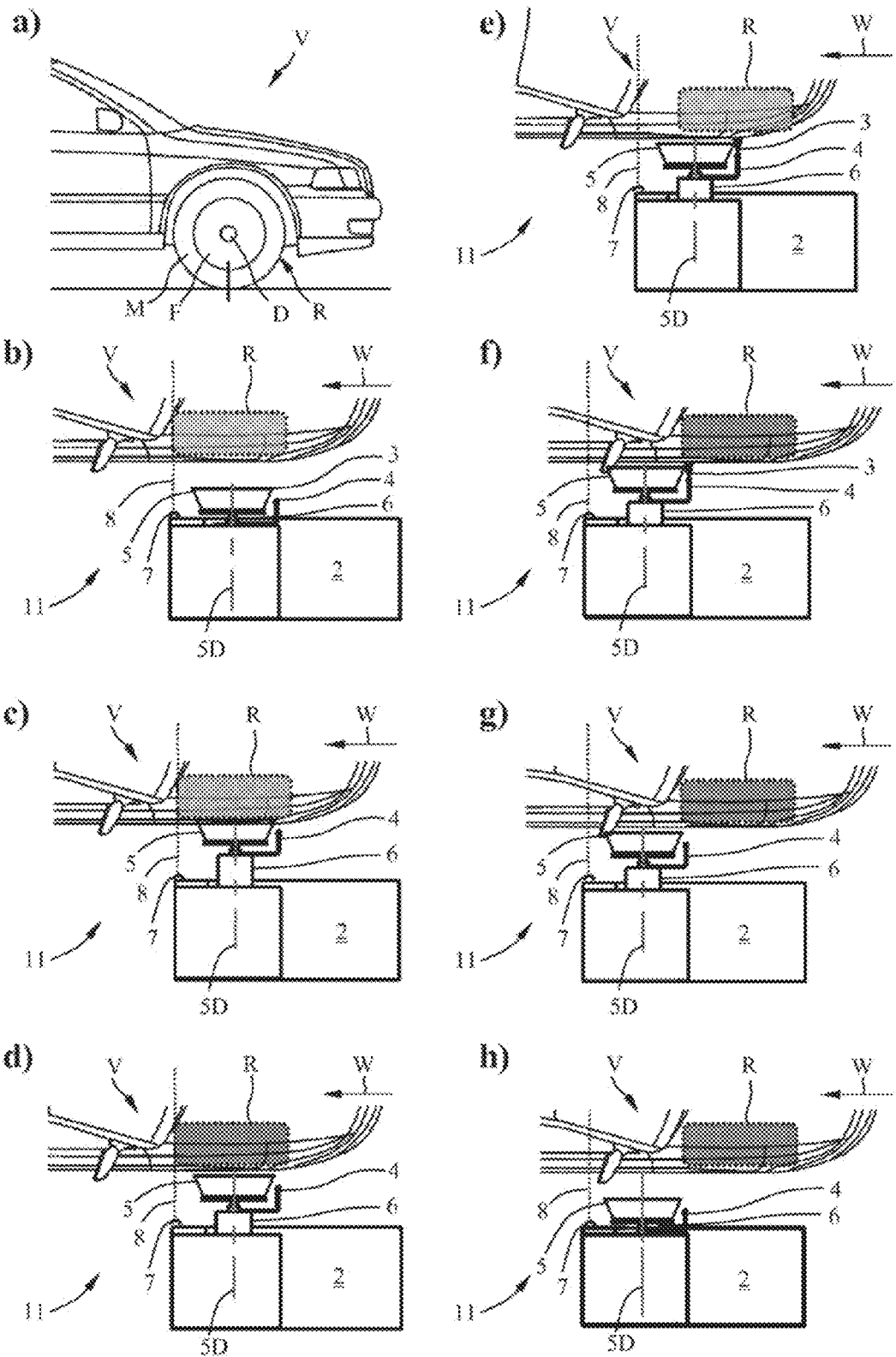

DEVICE AND METHOD FOR APPLYING A CLEANING FLUID TO A WHEEL OF A VEHICLE IN A VEHICLE WASHING INSTALLATION AND VEHICLE-WASHING DEVICE

FIELD OF THE INVENTION

The invention relates to a device for applying a cleaning fluid to a wheel of a vehicle in a vehicle washing installation, to a vehicle washing installation and to a method for applying a cleaning fluid to a wheel of a vehicle in a vehicle washing installation.

BACKGROUND OF THE INVENTION

In DE 20 1008 012 139 U1, a device for cleaning the wheel of a vehicle in a vehicle washing installation is disclosed. Said device comprises a wheel washing brush which is driven in rotation by a brush drive unit, and which is driven by a motor through a guide device between a rest position remote from the wheel and a cleaning position on the wheel, wherein the wheel washing brush is moved by the guide device from the rest position toward the wheel at a downward slant into the cleaning position. Before the wheel is cleaned with a wheel washing brush in such wheel washing devices, the cleaning fluid must first be sprayed onto the wheel in order to dissolve adhering debris which can then be removed more easily with the wheel washing brush.

An additional example of a known vehicle washing installation in the form of a movable washing portal 1 having two portal columns 2, 2' is shown in FIG. 1. A portal cross bar connecting the portal columns 2, 2' is omitted to simplify the drawing. Since, in FIG. 1, the represented parts of the washing portal 1 represented on both sides of the vehicle V to be washed are designed identically, primarily the lower side in FIG. 1, which is the left side in a washing direction W, is described below. The statements apply accordingly to the other portal column 2', wherein corresponding parts of the portal column 2', on the side which is on top in FIG. 1, bear the same reference numerals followed by an apostrophe as the corresponding parts on the other side, for example, 2' instead of 2.

In a wheel washing process, the vehicle V is first moved into a washing position shown in FIG. 1. Then the washing portal 1 moves first in the washing direction W, which extends in the longitudinal direction of the vehicle V. In order to spray the diagrammatically indicated wheel R with cleaning agent 3, 3', a cleaning nozzle 4 is arranged in the washing direction W before a wheel washing brush 5.

The wheel washing brush 5 is arranged in an extendable guide 6. The guide 6 is used in order to be able to bring, in the case of vehicles having different track widths, the wheel washing brush 5 as much as possible with its rotation axis to the axis height of the vehicle wheel R. From the position shown in FIG. 1, the washing portal then moves on in the washing direction W with the spray nozzle 4 along the wheel R, until the end of the wheel R is reached. Both the beginning and the end of the wheel R can be detected by a photoelectric barrier 7 which transmits, beneath the vehicle V, a light beam 8 transversely to the washing direction W.

To permit the sprayed-on cleaning fluid to act as long as possible on the wheel R, the washing portal 1 then moves on first in the washing direction W toward the rear wheel of the vehicle V and it sprays the latter in the same manner with cleaning liquid. Optionally, in the meantime, additional vehicle treatments, for example a vehicle washing, can be carried out. Subsequently, the washing portal 1 moves back against the washing direction W, detects by means of the photoelectric barrier 7 the wheel position again, and then removes the dissolved soiling on the wheel R by means of the extendable wheel washing brush 5.

FIG. 2 shows a top view on the portal column 2 of the washing portal 1 of FIG. 1 from the washing direction W, wherein, to improve the explanation, the wheel washing brush 5 with guide 6 is indicated only diagrammatically and in broken lines. FIG. 2 *a*) shows the case in which the wheel R with rim F1 and rubber coat M1 is very large, which is usually the case in vehicles having a large track width. The wheel R therefore is already located relatively close to the portal column 2. In order to be able to wet the large wheel rim F1 sufficiently with cleaning liquid, the cleaning nozzle 4 must provide, as shown in FIG. 2 *a*), a broadened spray jet 3. As is evident from a comparison of FIG. 1 and FIG. 2, the spray jet 3 is broadened substantially in the height direction, but not in the longitudinal direction of the vehicle V.

If now, in the same washing portal 1, a vehicle with small wheels is to be washed, which usually has a small track width, then such a small wheel R2, as shown in FIG. 2 *b*), is as a rule relatively far from the portal column 2. However, since the cleaning nozzle 4 is secured firmly to the portal column 2, the spray jet 3 has to spray very broadly, a process in which it then is broadened very strongly, as shown in FIG. 2 *b*). This has the disadvantage that, owing to the large distance from the spray nozzle 4 to the wheel R2, a clearly stronger spray jet 3 is required, i.e., a correspondingly higher pressure must be provided at the cleaning nozzle 4. In addition, the spray jet 3 to a large extent sprays past the wheel R2, so that a large portion of the cleaning fluid is sprayed unnecessarily on the ground or on areas of the vehicle above the wheel R2. This not only consumes clearly more cleaning liquid than is in fact needed for the small wheel R2, in addition the aggressive cleaning liquid for the wheel/rim cleaning also attacks portions of the car body, particularly decorative elements, such as decorative bars made of chrome or plastic.

An example of a known spray nozzle as described above is disclosed in DE 90 00 427 U1, which discloses a wheel washing device for vehicle wheels, having a washing head which can be adjusted with respect to the vehicle rim. The washing head carries as the only cleaning device either spray nozzles or a rotating washing brush, wherein the spray nozzles are provided for the complete cleaning of the rim. A joint adjustment of the spray nozzle and the rotating washing brush is not provided there.

An additional rim cleaning device, in which a washing brush is adjusted to the rim, is disclosed in DE 35 18 297 A1, wherein only permanently installed spray nozzles for the foam and the liquid are provided there as well. This device as well has the above-described disadvantages.

EP 2 077 211 A1 discloses a vehicle washing installation having a movable portal and arranged on it rim washing brushes that are adjustable to the rims. The rim washing brushes can in addition comprise a spray nozzle for applying a cleaning liquid to the rims, wherein the spray nozzle are [sic] centered relative to the rotation axis of the rims. A uniform distribution of the cleaning liquid on the rim with sufficient exposure time before the washing of the rims with rim washing brush is not possible there.

DE 93 11 390 U1 discloses a spraying device on a portal washing installation for motor vehicles, wherein wheel brushes are provided there for cleaning the vehicle rims, having spray nozzles arranged directly on them. For applying the spray liquid, the wheel brush is positioned at the height of the rims, that is, on the wheel axle, wherein the rim is then sprayed and subsequently cleaned. If, for cleaning the rims, a special aggressive rim cleaning agent is used, then, on the wheel brush, a second nozzle is provided, whose spray cone axis is parallel to the rotation axis of the wheel brush or its movement direction, as a result of which the spraying of the side portion of the vehicle is carried out more effectively. A uniform distribution of the cleaning liquid on the rim and particularly on its marginal areas with sufficient exposure time before the washing of the rims is not possible there.

EP 0 752 353 A1 relates to a washing device for vehicle wheels in a car wash, each having, arranged on the two sides of the movement area of the vehicle, a washing brush which rotates about a horizontal brush axle, and which can be pressed by means of a prestressing force onto the vehicle. A spray nozzle is arranged in the vehicle movement direction before or after the washing brush at a distance such that the high-pressure jet of the vehicle can reach the vehicle unaffected by the washing brush. Since the washing brush is pressed against the vehicle, the spray nozzle is held automatically at the correct distance from the vehicle, so that a determination of the distance of the spray nozzle from the wheel of the vehicle is not necessary.

EP 0 700 814 A1 relates to a portal washing installation having a rim brush and a side spray nozzle arranged on it, which is adjusted together with the rim brush, and adjustable in terms of the height. A distance measurement between the side washing device and the wheel of the vehicle is not present there, since the distance between the side spray nozzle and the vehicle is set by means of the holder of the rim brush.

SUMMARY OF THE INVENTION

The problem of the present invention therefore is to overcome the above-mentioned disadvantages and to provide a device for applying a cleaning liquid to a wheel of a vehicle, a vehicle washing installation as well as a method for applying a cleaning liquid to a wheel of a vehicle, which permit an economical application of the cleaning fluid matched to the size of the wheel to be cleaned.

First, one must take into consideration that the cleaning of the wheel does not refer to the cleaning of the entire wheel, that is also the inner sides of the wheel, but only to the cleaning of the portions of the wheel that are accessible from the outside of the vehicle, particularly the vehicle rim and optionally also the outer wheel coat.

A device mentioned at the start, which comprises the spray nozzle for movement between a rest position remote from the wheel and a spray position remote from the wheel at a spraying distance is arranged on a movable delivery device, is characterized according to the invention in that the device comprises means for determining the distance of the wheel from the device. As a result, the spray nozzle can always be brought into an optimal spraying position opposite the wheel, independently of the size of the wheel or the distance of the wheel from the device. In an advantageous variant, the delivery device can be formed by the guide of the wheel washing brush; the spray nozzle is thus moved together with the wheel washing brush. This allows a simple assembly of the device, since the delivery device requires no additional space and no drive unit. Optionally already existing vehicle washing installations can thus also be retrofitted in a simple manner with a device according to the invention.

A method mentioned at the start is characterized according to the invention in that the position of the wheel in the washing direction and the distance of the wheel from the device are determined, then the spray nozzle is moved into the spray position remote from the wheel at the spraying distance, subsequently the cleaning fluid is sprayed with a spray nozzle onto the wheel, and in the process the spray nozzle is moved in the washing direction along the wheel, and subsequently the spraying process is terminated when the front end of the wheel in the washing direction has been reached.

Preferably the means for determining the distance of the wheel from the device advantageously comprises the guide and the wheel washing brush. As a result, in step b) of the method according to the invention, the distance of the wheel from the device can be determined in that the wheel washing brush is moved toward the wheel, and a sensor detects when the wheel is reached by the wheel washing brush, such that the distance of the extended wheel washing brush from the device corresponds substantially to the distance of the wheel from the device. In an alternative embodiment, in step b), the distance of the wheel from the device can be determined in that the wheel washing brush is moved over a time period toward the wheel, which time period is required for the complete extension of the wheel washing brush, such that after the expiration of this time period, the distance of the extended wheel washing brush from the device corresponds to the distance of the wheel from the device. Since the application pressure of the wheel washing brush on the wheel is set in such a manner that the wheel is not damaged, it is thus possible to determine the distance of the wheel from the device in a simple manner without additional sensors and measurement electronics. This facilitates particularly the retrofitting of existing machines. Advantageously, in the embodiments of the methods which have just been described, before step b), the wheel washing brush can be adjusted to the wheel, wherein the rotation axis of the wheel and the rotation axis of the wheel washing brush are preferably mutually aligned transversely to the washing direction.

Here, it can be advantageous, after the wheel washing brush on the wheel has been moved and the distance of the wheel from the device has been determined, to move the guide away from the wheel by the spraying distance, as a result of which the spray nozzle is moved to the desired spraying distance.

In an operationally advantageous embodiment, the spray nozzle can be arranged in a washing direction of the vehicle washing installation behind the wheel washing brush, which is particularly advantageous if the guide and the wheel washing brush are used as means for determining the distance. Thus, the washing portal then needs to be stopped only for the determination of the distance of the wheel.

For reasons pertaining to safety technology, it can be advantageous, in this embodiment, to arrange the spray nozzle in a delivery direction of the guide behind the wheel washing brush, in order to reliably prevent a collision of the spray nozzle with the wheel as the wheel washing brush approaches the wheel.

A vehicle washing installation according to the invention comprises a device, described above and below, for applying a cleaning liquid to the wheel of a vehicle in the vehicle washing installation.

BRIEF DESCRIPTION OF THE DRAWINGS

Further features and advantages of the invention can be obtained in the following description of a preferred embodiment with reference to the drawings. The drawings show:

FIG. 1 a diagrammatic top view of a portion of a known vehicle washing installation;

FIG. 2 two diagrammatic top views of a portal column of the known vehicle washing installation of FIG. 1 with a vehicle having a large track width and large wheels (FIG. 2 a) and with a vehicle having small wheels and a small track width (FIG. 2 b);

FIG. 3 a diagrammatic top view of a vehicle washing installation according to the invention;

FIG. 4 two top views of a portal column of the vehicle washing installation of FIG. 3 with a vehicle having a large track width and large wheels (FIG. 4 a) and with a vehicle having a small track width and small wheels (FIG. 4 b);

FIG. 5 a side top view of a portion of a vehicle to be cleaned (FIG. 5 a) and top views of a portal column of the vehicle washing installation according to the invention shown in FIG. 3, in seven different positions (FIGS. 5 b-h).

DETAILED DESCRIPTION OF THE DRAWINGS

In FIG. 3, a part of a vehicle washing installation in the form of a washing portal 11 is represented. If parts of the washing portal 11 shown in FIGS. 3-5 correspond to the parts of the known washing portal 1 shown in FIGS. 1-3, the same reference numerals are used. Indications regarding the known washing portal 1 from FIGS. 1-3 apply correspondingly, and the same applies to mutually corresponding parts on both sides of the respective washing portal 1 and 11.

The washing portal 11 according to FIG. 3 has portal columns 2, 2'. On the portal column 2, a wheel washing brush 5 is provided on a guide 6 which can be extended transversely to the washing direction W, as well as a photoelectric barrier 7 for determining the beginning and the end of the wheel R.

In contrast to the known washing portal 1, in the case of the washing portal 11 according to the invention, on the other hand, the cleaning nozzle 4, also referred to as spray nozzle or nozzle, for applying the cleaning fluid is not attached firmly and in the washing direction W before the wheel washing brush 5 to the portal column 2, but to the extendable guide 6 in the washing direction W behind the washing brush 5. For this purpose, an extension arm 6' is provided on the guide 6, which extends along the height of the rotation axis of the wheel washing brush 5, as can be seen in FIG. 4.

As a result, as shown in FIG. 4, the cleaning nozzle 4 can always be brought in a position at an identical distance A from the wheel R to be cleaned. As can be seen in FIG. 4 b), the spray jet 3 then wets nearly exclusively the small wheel R2, so that only a small portion of the sprayed cleaning liquid is not applied to the wheel R2, but sprayed past it. Conversely, the cleaning jet 3 can be adjusted to the large, usually legally established, maximum permissible wheel size of a large wheel R1, such that the majority portion of the large wheel R1 can be sprayed with cleaning liquid 3, as represented in FIG. 4 a).

In this manner, on the one hand, considerable quantities of cleaning liquid can be saved, and, on the other hand, sensitive portions of vehicles, particularly of small vehicles, can be protected from the aggressive cleaning liquids. In an alternative embodiment of the invention, which is not shown here, instead of being situated on the movable guide 6 of the extension arm 6', the cleaning nozzle can also comprise its own guide, which is preferably arranged next to the guide 6 of the wheel washing brush 5.

The distance A of the cleaning nozzle 4 from the outside of the wheel R to be cleaned is set according to the invention in that a detection device for determining the distance from the wheel is provided. This can be an ultrasound, infrared, laser or similar method which in itself is known. In a preferred embodiment of the invention, however, such an additional sensory system is dispensed with. Rather, the approach of the wheel washing brush 5 toward the wheel R is then used for the detection. For this purpose, the cleaning nozzle 4 is advantageously arranged in the washing direction W behind the wheel washing brush 5. The course of a detection of the wheel R and the approach of the cleaning nozzle 4 at the predetermined distance A are shown in FIGS. 5 b)-h). FIG. 5 a) is used only to represent the exact position of the wheel R of the vehicle V.

In FIG. 5 b), by means of the photoelectric barrier 7, the end of the wheel R is detected, wherein the beginning of the wheel R is already detected beforehand by means of the photoelectric barrier 7. From these two values, the position of the wheel axis D is then determined, since the wheel axis D is in fact precisely in the middle between the two values. The rotation axis 5D of the wheel washing brush 5 is then aligned by means of the portal column 2 with the rotation axis D of the wheel R, as shown in FIG. 5 b). Subsequently, in FIG. 5 c), the guide 6 moves the wheel washing brush 5 onto the wheel R, wherein the guide 6, in a manner which in itself is known, can detect whether it has reached the wheel R. This occurs, for example, by providing a resistance sensor in the guide, which detects the mechanical resistance of the wheel R with respect to the wheel washing brush 5. Alternatively, the guide 6 can also be extended for a certain time, as required for its minimal deployment path, independently of whether it already has abutted beforehand against the wheel R. Since the delivery force of the guide 6 is set in such a manner that the wheel R is not damaged by the pushing of the wheel washing brush 5, even when the guide 6 pushes permanently against the wheel R for the maximum extension duration, after the expiration of the time required for a complete extension path, it is ensured that the wheel washing brush 5 is applied reliably against the wheel R. Subsequently, the guide 6 is moved back from the position shown in FIG. 5 c) directly on the wheel R into the position shown in FIG. 5 d) at the distance A of the cleaning nozzle 4 from the wheel R. This corresponds to the optimal distance A for the application of the cleaning liquid on the wheel R. Subsequently, in FIG. 5 e), the cleaning liquid is sprayed by means of the cleaning jets 3 on the wheel R, wherein the portal column 2 in the meantime continues on in the washing direction W until it reaches the position shown in FIG. 5 f).

In FIG. 5 g), the spraying process of the cleaning nozzle 4 is then terminated, which can be determined on the basis of the values for the vehicle contour and also the tire geometry, determined beforehand by the photoelectric barrier 7 and stored in an installation control unit of the washing portal 11. In FIG. 5 h), the guide 6 then moves the wheel washing brush 5 back again into the completely retracted position on the portal column 2. Subsequently, in the same manner, a rear wheel, not shown in the drawing, of the vehicle V is sprayed with cleaning liquid. Subsequently, during the return process of the washing portal 12 against the washing direction W, the wheels are then cleaned in a known manner with the wheel washing brush 5.

The embodiment of the invention described substantially in FIG. 5 has the advantage that no additional sensors or detection devices have to be provided for the determination of the desired distance A between the wheel R and the cleaning nozzle 4. Rather, the components which are already present, particularly the photoelectric barrier 7 and the wheel washing brush 5 with guide 6, are used in order to be able to set the desired distance A in a simple manner.

The invention claimed is:

1. A method for applying a cleaning fluid to a wheel of a vehicle in a vehicle washing installation, the method carried out using a device comprising;
   a wheel washing brush having a guide;
   a moveable delivery device formed by the wheel washing brush and the guide; and
   a spray nozzle arranged on the moveable delivery device; the method comprising steps for:
   a) determining position of the wheel in a washing direction;
   b) determining distance of the wheel from the device using the wheel washing brush and the guide of the wheel washing brush;
   c) moving the spray nozzle from a rest position remote from the wheel to the spraying position at a spraying distance from the wheel using the moveable delivery device;
   d) spraying cleaning fluid onto the wheel using the spray nozzle and moving the spray nozzle along the wheel in the washing direction, and
   e) terminating spraying when a front end of the wheel in the washing direction has been reached.

2. The method according to claim 1, further comprising, prior to carrying out step b), aligning the wheel washing brush with the wheel.

3. The method according to claim 2, further comprising, prior to carrying out step b) mutually aligning, transversely to the washing direction, a rotation axis of the wheel with a rotation axis of the wheel washing brush.

4. The method according to claim 1, wherein carrying out step b) comprises determining distance of the wheel from the device by extending the wheel washing brush towards the wheel and using a sensor to detect when the wheel is reached by the wheel washing brush, in which distance of the extended wheel washing brush from the device corresponds to a distance of the wheel from the device.

5. The method according to claim 1, wherein carrying out step b) comprises determining distance of the wheel from the device by extending the wheel washing brush towards the wheel over a predetermined time period necessary for complete extension of the wheel washing brush in which, after expiration of the predetermined time period, distance of the extended wheel washing brush from the device corresponds to distance of the wheel from the device.

6. The method according to claim 1, further comprising, when carrying out step c), moving the guide of the wheel washing brush away from the wheel wherein a distance moved corresponds to the spray distance.

7. The method according to claim 1, wherein applying a cleaning fluid includes applying an amount of cleaning fluid corresponding to size of the wheel to be cleaned.

8. The method in accordance with claim 1, further comprising determining beginning and end of the wheel using a photoelectric barrier.

9. A method for applying a cleaning fluid to a wheel of a vehicle in a vehicle washing installation, the method carried out using a device comprising;
   a wheel washing brush having a guide;
   a moveable delivery device formed by the wheel washing brush and the guide; and
   a spray nozzle arranged on the moveable delivery device; the method comprising steps for:
   a) determining position of the wheel in a washing direction;
   b) determining distance of the wheel from the device by extending the wheel washing brush towards the wheel over a predetermined time period necessary for complete extension of the wheel washing brush in which, after expiration of the predetermined time period, distance of the extended wheel washing brush from the device corresponds to distance of the wheel from the device;
   c) moving the spray nozzle from a rest position remote from the wheel to the spraying position at a spraying distance from the wheel using the moveable delivery device;
   d) spraying cleaning fluid onto the wheel using the spray nozzle and moving the spray nozzle along the wheel in the washing direction, and
   e) terminating spraying when a front end of the wheel in the washing direction has been reached.

10. The method in accordance with claim 9, further comprising determining beginning and end of the wheel using a photoelectric barrier.

\* \* \* \* \*